(12) United States Patent
Malfer et al.

(10) Patent No.: US 7,112,230 B2
(45) Date of Patent: Sep. 26, 2006

(54) FUELS COMPOSITIONS FOR DIRECT INJECTION GASOLINE ENGINES

(75) Inventors: Dennis J. Malfer, Glen Allen, VA (US); Scott D. Schwab, Richmond, VA (US); Timothy J. Henly, Maidens, VA (US)

(73) Assignee: Afton Chemical Intangibles LLC, Richmond, VA (US)

( * ) Notice: Subject to any disclaimer, the term of this patent is extended or adjusted under 35 U.S.C. 154(b) by 628 days.

(21) Appl. No.: 09/952,260

(22) Filed: Sep. 14, 2001

(65) Prior Publication Data

US 2003/0079399 A1   May 1, 2003

(51) Int. Cl.
*C10L 1/18* (2006.01)
*C10L 1/22* (2006.01)

(52) U.S. Cl. .................. 44/415; 44/418; 44/419; 44/329; 44/333; 44/334; 44/335; 44/336; 44/338; 44/340; 44/341; 44/342; 44/343; 44/344; 44/432

(58) Field of Classification Search ............ 44/412, 44/418, 419, 415, 329, 333, 334, 335, 336, 44/338, 340, 341, 342, 343, 344, 424, 425, 44/432
See application file for complete search history.

(56) References Cited

U.S. PATENT DOCUMENTS

| | | | | |
|---|---|---|---|---|
| 2,333,294 A | * | 11/1943 | Chenicek | 44/432 |
| 2,598,213 A | * | 5/1952 | Blair, Jr. | 507/244 |
| 2,675,382 A | | 4/1954 | Melamed | |
| 2,891,850 A | * | 6/1959 | Cosgrove et al. | 44/432 |
| 3,598,553 A | * | 8/1971 | Rosenwald | 44/425 |
| 3,719,458 A | * | 3/1973 | Cadorette et al. | 44/432 |
| 4,244,703 A | * | 1/1981 | Kaspaul | 44/367 |
| 4,877,416 A | * | 10/1989 | Campbell | 44/432 |
| 5,074,991 A | * | 12/1991 | Weers | 208/236 |
| 5,162,049 A | | 11/1992 | Bostick et al. | |
| 5,215,547 A | | 6/1993 | Bostick et al. | |
| 5,551,957 A | * | 9/1996 | Cunningham et al. | 44/347 |
| 5,634,951 A | | 6/1997 | Colucci et al. | |
| 5,725,612 A | | 3/1998 | Malfer et al. | |
| 5,746,783 A | | 5/1998 | Compere et al. | |
| 5,830,243 A | | 11/1998 | Wolak et al. | |
| 5,997,593 A | * | 12/1999 | McDonnell et al. | 44/421 |
| 6,176,886 B1 | | 1/2001 | Loper et al. | |

FOREIGN PATENT DOCUMENTS

WO   WO 01/42398 A1   6/2001
WO   WO 01/42399 A1   6/2001

* cited by examiner

*Primary Examiner*—Cephia D. Toomer
(74) *Attorney, Agent, or Firm*—Dennis H. Rainear; Paige J. Thomson; J. Clay Matthews

(57) ABSTRACT

Injector deposits in a direct injection gasoline engine are reduced by providing as fuel for the operation of said direct injection engine a fuel composition comprising a fuel-soluble compound having the formula (I):

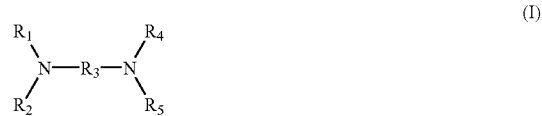

wherein $R_1$ and $R_2$ are independently $C_{1-4}$ alkyl, $R_3$ is a radical of the formula $C_mH_{2m}$ wherein m is an integer of 2 to 6, $R_4$ and $R_5$ are each independently (i) hydrogen (ii) $C_{1-4}$ alkyl, (iii)

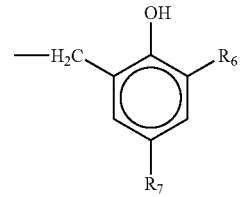

wherein $R_6$ is selected from the group consisting of hydrogen and $C_{1-4}$ alkyls and $R_7$ is selected from the group consisting of hydrogen and $C_{1-30}$ alkyl, (iv)

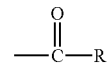

wherein $R_8$ is a saturated or unsaturated, linear, branched or cyclic, $C_{7-23}$ hydrocarbyl group or (v) wherein $R_4$ and $R_5$ together with the nitrogen atom to which they are bonded, form a cyclic ring in which further hetero atoms.

2 Claims, No Drawings

FUELS COMPOSITIONS FOR DIRECT INJECTION GASOLINE ENGINES

FIELD OF THE INVENTION

The present invention relates to new spark-ignition fuel compositions and methods for controlling, i.e. reducing or eliminating, deposits and reducing soot formation in direct injection gasoline (DIG) engines. More particularly, the invention relates to fuel compositions comprising a spark-ignition fuel and a fuel-soluble deposit control additive comprising a specific amine compound or derivative thereof and the use of said fuel compositions in DIG engines to reduce injector plugging.

BACKGROUND OF THE INVENTION

Over the years considerable work has been devoted to additives for controlling (preventing or reducing) deposit formation in the fuel induction systems of spark-ignition internal combustion engines. In particular, additives that can effectively control fuel injector deposits, intake valve deposits and combustion chamber deposits represent the focal point of considerable research activities in the field and despite these efforts, further improvements are desired.

Direct injection gasoline (DIG) technology is currently on a steep developmental curve because of its high potential for improved fuel economy and power. Environmentally, the fuel economy benefits translate directly into lower carbon dioxide emissions, a greenhouse gas that could contribute to possible global warming.

Conventional multi-port injection (MPI) engines form a homogeneous pre-mixture of gasoline and air by injecting gasoline into the intake port, while a direct injection gasoline engine injects gasoline directly into the combustion chamber like a diesel engine so that it becomes possible to form a stratified fuel mixture which contains greater than the stoichiometric amount of fuel in the neighborhood of the spark plug but highly lean in the entire combustion chamber. Due to the formation of such a stratified fuel mixture, combustion with the overall highly lean mixture can be achieved, leading to an improvement in fuel consumption approaching that of a diesel engine.

Injection timing is controlled to match load conditions. The fuel control provides combustion of an ultra lean mixture of gasoline and air for higher fuel efficiency than diesel engines. Also, a compression ratio of about 12.0 compared to that of about 10.5 for multi port injection engines delivers higher volumetric efficiency and response, surpassing conventional MPI engine performance.

There are a number of technical issues to be resolved with DIG technology, and one of them is injector performance with different gasoline fuels on the world market. Being located in the combustion chamber, DIG injectors are exposed to a much harsher environment than conventional spark-ignition engines with port fuel injectors (PFI). This more severe environment can accelerate fuel degradation and oxidation resulting in increased deposits.

DIG technology promises about a third less carbon dioxide emissions than comparable conventional multi-port injection. This is achieved with a 10–15% improvement in fuel consumption when operating in the homogeneous mode, and up to 35% when operating in the lean stratified mode. Fuel economy benefits also translate into fossil energy conservation and savings for the consumer. In addition, the DIG operation platform facilitates up to a 10% power increase for the same fuel burned in the equivalent MPI configuration.

Current generation DIG technologies have experienced deposit problems. Areas of concern include fuel rails, injectors, combustion chamber (CCD), crankcase soot loadings, and intake valves (IVD).

Fuel related deposits in DIG engines are an issue of current interest since this technology is now commercial in Japan and Europe. Fuel injector performance is at the forefront of this issue because the DIG combustion system relies heavily on fuel spray consistency to realize its advantages in fuel economy and power, and to minimize exhaust emissions. A consistent spray pattern enables more precise electronic control of the combustion event and the exhaust after-treatment system.

There is a desire in the petroleum industry to produce a fuel suitable for use in both MPI and DIG engines, that is a fuel having effective IVD control for a MPI engine as well as a fuel having effective injector deposit control suitable for a DIG engine. Additives useful in reducing or controlling intake valve deposits in a MPI engine may have little or no effect or even an adverse effect in controlling or reducing injector deposits in a DIG engine. Likewise, additives useful in controlling or reducing injector deposits in a DIG engine may have little or no effect or even an adverse effect in controlling or reducing intake valve deposits in a MPI engine. An object of the present invention is to provide fuel compositions that provide effective injector deposit control in DIG engines as well as providing fuel compositions which provide effective deposit control in both MPI and DIG engines.

There are references teaching fuel compositions containing amines and amine derivatives compounds, for example, U.S. Pat. Nos. 5,643,951; 5,725,612 and 6,176,886. However, none of these references teach the use of fuel compositions containing the amine compounds and derivatives of the present invention in direct injection gasoline engines or the impact such compounds have on deposits in these engines.

SUMMARY OF THE INVENTION

The present invention is directed to a fuel composition comprising (a) a spark-ignition internal combustion fuel; and (b) an fuel-soluble deposit control additive. Further, this invention is directed to methods of controlling deposits in direct injection gasoline engines. In another embodiment, the inventive composition is provided as an aftermarket or "top treat" composition.

DETAILED DESCRIPTION OF THE INVENTION

Deposit Control Additives

The deposit control additives of the present invention can be represented by the formula (I):

wherein $R_1$ and $R_2$ are independently $C_{1-4}$ alkyl, $R_3$ is a radical of the formula $C_mH_{2m}$ wherein m is an integer of 2 to 6, $R_4$ and $R_5$ are each independently (i) hydrogen (ii) $C_{1-4}$ alkyl, (iii)

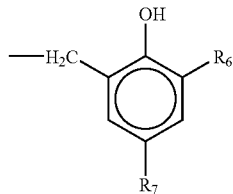

wherein $R_6$ is selected from the group consisting of hydrogen and $C_{1-4}$ alkyls and $R_7$ is selected from the group consisting of hydrogen and $C_{1-30}$ alkyl, (iv)

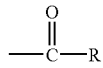

wherein $R_8$ is a saturated or unsaturated, linear, branched or cyclic, $C_{7-23}$ hydrocarbyl group or (v) wherein $R_4$ and $R_5$ together with the nitrogen atom to which they are bonded, form a cyclic ring in which further hetero atoms may be incorporated.

Preferred injector deposit control additives b) include 1) aliphatic diamines having one and only one primary or secondary amino group and one tertiary amino group wherein $R_4$ and $R_5$ are each independently selected from hydrogen and $C_{1-4}$ alkyls, 2) substituted triazines wherein $R_4$ and $R_5$ together with the nitrogen atom to which they are bonded form a cyclic ring, 3) low molecular weight Mannich condensation products wherein at least one of $R_4$ or $R_5$ is of the formula:

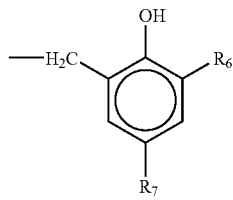

and 4) amides wherein at least one of $R_4$ or $R_5$ is of the formula:

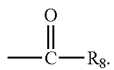

Representative aliphatic diamines include N,N-dihydrocarbyl alkylene diamines such as N,N-dimethyl-1,3-propanediamine (also referred to as N,N-dimethylaminopropylamine (DMAPA)), wherein $R_1$=$R_2$=—$CH_3$, $R_3$=—$C_3H_6$— and $R_4$=$R_5$=H; and N,N,N'-trimethyl-1,3-propanediamine, wherein $R_1$=$R_2$=—$CH_3$, $R_3$=—$C_3H_6$—, $R_4$=H and $R_5$=—$CH_3$.

Hetero-ring materials, preferably substituted triazines, can be prepared by reacting in appropriate proportions the primary diamines described above, i.e., $R_4$ and $R_5$ are each hydrogen, with formaldehyde or a formaldehyde source (such as paraformaldehyde) under conditions known in the art to form a triazine ring. When forming the hetero-ring deposit control additives of the present invention, mixtures of the above-described aliphatic primary diamines and other primary amines may be used, however, it is preferred that the substituted triazines are prepared from aliphatic diamines, as described above, as the only amine. Suitable substituted triazines of the present invention may be represented by the formula:

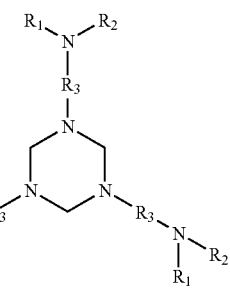

wherein $R_1$, $R_2$ and $R_3$ are as defined above. A particularly preferred substituted triazine is one prepared from 3-dimethylaminopropylamine as the sole amine, the product so formed principally comprises 1,3,5-tris[3-(dimethylamino)propyl]hexahydro-1,3,5-triazine. Preparation of such compounds is described in the literature, for example, U.S. Pat. Nos. 2,675,382; 5,162,049; 5,215,547; 5,746,783; and 5,830,243, the disclosures of which are incorporated herein in their entirety.

Representative low molecular weight Mannich condensation products suitable for use as the deposit control additives of the present invention may be prepared by the reaction of a low molecular weight alkyl-substituted hydroxyaromatic compound, an aldehyde and an aliphatic diamine having one and only one primary or secondary amino group and one tertiary amino group under suitable Mannich reaction conditions.

The low molecular weight alkyl-substituted hydroxyaromatic compounds and aldehydes used in the preparation of the Mannich reaction products of the present invention may be any such compounds known and applied in the art, in accordance with the foregoing limitations.

The alkyl-substituted hydroxyaromatic compounds that may be used in forming the present low molecular weight Mannich condensation products may be prepared by alkylating a hydroxyaromatic compound, such as phenol or cresol. The hydroxyaromatic compound may be monoalkylated or di-alkylated. The alkylation of the hydroxyaromatic compound is typically performed in the presence of an alkylating catalyst at a temperature in the range of about 50 to about 200° C. Acidic catalysts are generally used to promote Friedel-Crafts alkylation. Typical catalysts used in commercial production include sulphuric acid, $BF_3$, aluminum phenoxide, methanesulphonic acid, cationic exchange resin, acidic clays and modified zeolites.

The low molecular weight alkyl-substituents on the hydroxyaromatic compound contain from 9 to 30 carbon atoms, preferably 12 to 18 carbon atoms. The low molecular weight alkyl substituents include alpha-olefins having single carbon number fraction between $C_9$ and $C_{30}$ or a mixture of carbon number fractions between $C_9$ and $C_{30}$. The alpha-olefins may be isomerized to produce an olefin containing an internal double bond, which may be used for alkylation of the hydroxyaromatic compound. Also useful as the low molecular weight alkyl substituent are oligomers of 1-olefins. Preferred olefin oligomers include propylene trimers ($C_9$) and propylene tetramers ($C_{12}$). The low molecular weight Mannich condensation products may be, and preferably are, made from a low molecular weight alkyl-substituted phenol or cresol.

The preferred configuration of the alkyl-substituted hydroxyaromatic compound is that of a para-substituted mono-alkylphenol or para-substituted mono-alkylcresol. However, any alkylphenol or alkylcresol readily reactive in the Mannich condensation reaction may be employed.

Representative aldehydes for use in the preparation of the low molecular weight Mannich condensation products include the aliphatic aldehydes such as formaldehyde, acetaldehyde, propionaldehyde, butyraldehyde, valeraldehyde, caproaldehyde, heptaldehyde, stearaldehyde. Aromatic aldehydes that may be used include benzaldehyde and salicylaldehyde. Illustrative heterocyclic aldehydes for use herein are furfural and thiophene aldehyde, etc. Also useful as aldehydes in the present invention are formaldehyde-producing reagents such as paraformaldehyde, or aqueous formaldehyde solutions such as formalin. Most preferred is formaldehyde or formalin.

The condensation reaction among the low molecular weight alkyl-substituted hydroxyaromatic compound, the amine and the aldehyde may be conducted at a temperature in the range of about 40 to about 200° C. The reaction can be conducted in bulk (no diluent or solvent) or in a solvent or diluent. Water is evolved and can be removed by azeotropic distillation during the course of the reaction. Typically, the Mannich additives are formed by reacting the alkyl-substituted hydroxyaromatic compound, amine and aldehyde in the molar ratio of 1.0:0.5-2.0:0.5-3.0, respectively.

The deposit control additives of the present invention also include amides obtained by reacting the aliphatic diamines described above with a monocarboxylic acid wherein at least one of $R_4$ or $R_5$ is of the formula:

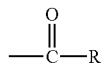

and $R_8$ is a saturated or unsaturated, linear, branched or cyclic, $C_{7-23}$ hydrocarbyl group. Suitable acids include 2-ethylhexanoic acid, capric acid, myristic acid, palmitic acid, stearic acid, tall oil acids, linoleic acid, oleic acid, naphthenic acids, as well as isomers and mixtures thereof. In a preferred embodiment, the acids used to form the reaction products will contain low amounts of unsaturation, preferably no unsaturation, such that the reaction products of the present invention have Iodine Values of 150 or less. As those skilled in the art will appreciate, Iodine Value is a measure of unsaturation. Preferably the reaction products will have an Iodine Value of 125 or less, more preferably 75 or less, even more preferably 25 or less and most preferably 5 or less. While the reaction products of the present invention effectively control injector deposits in DIG engines, it is preferred to use reaction products having low Iodine Values in fuels that may or will be used in MPI engines.

The amide deposit control additives of the present invention are prepared by reacting a monocarboxylic acid and the diamine under conditions suitable to form amides. The condensation reaction among the monocarboxylic acid and the diamine may be conducted at a temperature typically in the range of from 40 to 250° C. The reaction can be conducted in bulk (no diluent or solvent) or in a solvent or diluent, for example, a hydrocarbon solvent. Water is evolved and can be removed by azeotropic distillation during the course of the reaction. In a preferred embodiment, the mole ratio of monocarboxylic acid to diamine will be in the range of 0.8 to 1.2, preferably 1, mole of monocarboxylic acid to 1 mole of diamine.

The above-described reaction products are preferably added to the fuel composition in an amount sufficient to provide control, including reduction or elimination of, deposits. For example, the reaction products are preferably added to the fuel in proportions effective to reduce the volume of injector deposits in a direct injection gasoline engine operated on said fuel containing said reaction products to below the volume of injector deposits in said engine operated in the same manner on the same fuel except that it is devoid of said reaction products. Economically, it is desirable to use the least amount of additive effective for the desired purpose. Typically, the reaction products of the present invention are present in an amount sufficient to provide 0.1 to 15, preferably 0.3 to 10, more preferably 0.5 to 7, and most preferably 0.5 to 5, pounds of additive per 1000 barrels of fuel.

The fuel compositions of the present invention may contain supplemental additives in addition to the injector deposit control additives described above. Said supplemental additives include dispersants/detergents, antioxidants, carrier fluids, metal deactivators, dyes, markers, corrosion inhibitors, biocides, antistatic additives, drag reducing agents, demulsifiers, emulsifiers, dehazers, anti-icing additives, antiknock additives, anti-valve-seat recession additives, surfactants, lubricity additives and combustion improvers.

The fuel compositions of the present invention may, and typically do, contain high molecular weight amine detergents. The amine detergents include those well known in the art for use in fuels for MPI engines to control intake valve deposits. Suitable amine detergents for use in the present invention include nitrogen-containing derivatives of hydrocarbyl succinic acylating agents, Mannich condensation products, hydrocarbyl amines and polyetheramines. When used, the amine detergents are typically present in an amount sufficient to control intake valve deposits and are typically present in an amount of from 5 to 100 pounds by weight of additive per thousand barrels by volume of fuel.

The nitrogen-containing derivatives of hydrocarbyl succinic acylating agents suitable for use in the present invention include hydrocarbyl succinimides, succinamides, succinimide-amides and succinimide-esters. The nitrogen-containing derivatives of hydrocarbyl succinic acylating agents are typically prepared by reacting a hydrocarbyl-substituted succinic acylating agent with a polyamine.

The hydrocarbyl-substituted succinic acylating agents include the hydrocarbyl-substituted succinic acids, the hydrocarbyl-substituted succinic anhydrides, the hydrocarbyl-substituted succinic acid halides (especially the acid fluorides and acid chlorides), and the esters of the hydrocarbyl-substituted succinic acids and lower alcohols (e.g., those containing up to 7 carbon atoms), that is, hydrocarbyl-substituted compounds which can function as carboxylic acylating agents. Of these compounds, the hydrocarbyl-substituted succinic acids and the hydrocarbyl-substituted succinic anhydrides and mixtures of such acids and anhydrides are generally preferred, the hydrocarbyl-substituted succinic anhydrides being particularly preferred.

The acylating agent for producing the detergent is preferably made by reacting a polyolefin of appropriate molecular weight (with or without chlorine) with maleic anhydride. However, similar carboxylic reactants can be employed such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters.

For example, hydrocarbyl-substituted succinic anhydrides may be prepared by the thermal reaction of a polyolefin and maleic anhydride, as described, for example in U.S. Pat. Nos. 3,361,673 and 3,676,089. Alternatively, the substituted succinic anhydrides can be prepared by the reaction of chlorinated polyolefins with maleic anhydride, as described, for example, in U.S. Pat. No. 3,172,892. A further discussion of hydrocarbyl-substituted succinic anhydrides can be found, for example, in U.S. Pat. Nos. 4,234,435; 5,620,486 and 5,393,309.

The mole ratio of maleic anhydride to olefin can vary widely. It may vary, for example, from 5:1 to 1:5, a more preferred range is 3:1 to 1:3, preferably the maleic anhydride is used in stoichiometric excess, e.g. 1.1–5 moles maleic anhydride per mole of olefin. The unreacted maleic anhydride can be vaporized from the resultant reaction mixture.

Polyalkenyl succinic anhydrides may be converted to polyalkyl succinic anhydrides by using conventional reducing conditions such as catalytic hydrogenation. For catalytic hydrogenation, a preferred catalyst is palladium on carbon. Likewise, polyalkenyl succinimides may be converted to polyalkyl succinimides using similar reducing conditions.

The hydrocarbyl substituent on the succinic anhydrides employed in the invention is generally derived from polyolefins that are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, polyisobutene, and the polyalphaolefins produced from 1-octene and 1-decene.

A particularly preferred polyalkyl or polyalkenyl substituent is one derived from polyisobutene. Suitable polyisobutenes for use in preparing the succinimide-acids of the present invention include those polyisobutenes that comprise at least about 20% of the more reactive methylvinylidene isomer, preferably at least 50% and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808.

Hydrocarbyl succinimides are obtained by reacting a hydrocarbyl-substitued succinic anhydride, acid, acid-ester or lower alkyl ester with an amine containing at least one primary amine group. Representative examples are given in U.S. Pat. Nos. 3,172,892; 3,202,678; 3,219,666; 3,272,746; 3,254,025, 3,216,936, 4,234,435; and 5,575,823. The alkenyl succinic anhydride may be prepared readily by heating a mixture of olefin and maleic anhydride to about 180–220° C. The olefin is preferably a polymer or copolymer of a lower monoolefin such as ethylene, propylene, isobutene and the like. The more preferred source of alkenyl group is from polyisobutene having a molecular weight up to 5000 or higher. In a still more, preferred embodiment the alkenyl is a polyisobutene group having a molecular weight of about 500–2000 and most preferably about 700–1500.

Amines which may be reacted with the alkenyl succinic anhydride to form the hydrocarbyl-succinimide include any that have at least one primary amine group that can react to form an imide group. A few representative examples are: methylamine, 2-ethylhexylamine, n-dodecylamine, stearylamine, N,N-dimethyl-propanediamine, N-(3-aminopropyl) morpholine, N-dodecyl propanediamine, N-aminopropyl piperazine ethanolamine, N-ethanol ethylene diamine and the like. Preferred amines include the alkylene polyamines such as propylene diamine, dipropylene triamine, di-(1,2-butylene)triamine, tetra-(1,2-propylene)pentaamine.

The most preferred amines are the ethylene polyamines which have the formula $H_2N(CH_2CH_2NH)_nH$ wherein n is an integer from one to ten. These ethylene polyamines include ethylene diamine, diethylene triamine, triethylene tetraamine, tetraethylene pentaamine, pentaethylene hexaamine, and the like, including mixtures thereof in which case n is the average value of the mixture. These ethylene polyamines have a primary amine group at each end so can form mono-alkenylsuccinimides and bis-alkenylsuccinimides. Thus especially preferred hydrocarbyl succinimides for use in the present invention are the products of reaction of a polyethylenepolyamine, e.g. triethyleneo tetramine or tetraethylene pentamine, with a hydrocarbon substituted carboxylic acid or anhydride made by reaction of a polyolefin, preferably polyisobutene, having a molecular weight of 500 to 2,000, especially 700 to 1500, with an unsaturated polycarboxylic acid or anhydride, e.g. maleic anhydride.

The Mannich base detergents suitable for use in the present invention include the reaction products of a high molecular weight alkyl-substituted hydroxyaromatic compound, aldehydes and amines. The alkyl-substituted hydroxyaromatic compound, aldehydes and amines used in making the Mannich reaction products of the present invention may be any such compounds known and applied in the art, in accordance with the foregoing limitations.

The high molecular weight alkyl substituents on the benzene ring of the hydroxyaromatic compound are derived from polyolefin having a number average molecular weight ($M_n$) of from about 500 to about 3000, preferably from about 700 to about 2100, as determined by gel permeation chromatography (GPC). It is also preferred that the polyolefin used have a polydispersity (weight average molecular weight/number average molecular weight) in the range of about 1 to about 4 (preferably from about 1 to about 2) as determined by GPC.

The alkylation of the hydroxyaromatic compound is typically performed in the presence of an alkylating catalyst at a temperature in the range of about 0 to about 200° C., preferably 0 to 100° C. Acidic catalysts are generally used to promote Friedel-Crafts alkylation. Typical catalysts used in commercial production include sulphuric acid, $BF_3$, aluminum phenoxide, methanesulphonic acid, cationic exchange resin, acidic clays and modified zeolites.

Polyolefins suitable for forming the high molecular weight alkyl-substituted hydroxyaromatic compounds include polypropylene, polybutenes, polyisobutylene, copolymers of butylene and/or butylene and propylene, copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the high molecular weight alkyl-substituted hydroxyaromatic compounds are substantially aliphatic hydrocarbon polymers.

Polybutylene is preferred. Unless otherwise specified herein, the term "polybutylene" is used in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins. So-called high reactivity polyisobutenes having relatively high proportions of polymer molecules having a terminal vinylidene group are also suitable for use in forming the long chain alkylated phenol reactant. Suitable high-reactivity polyisobutenes include those polyisobutenes that comprise at least about 20% of the more reactive methylvinylidene isomer, preferably at least 50% and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808.

The Mannich detergent may be made from a high molecular weight alkylphenol or alkylcresol. However, other phenolic compounds may be used including high molecular weight alkyl-substituted derivatives of resorcinol, hydroquinone, catechol, hydroxydiphenyl, benzylphenol, phenethylphenol, naphthol, tolylnaphthol, among others. Preferred for the preparation of the Mannich detergents are the polyalkylphenol and polyalkylcresol reactants, e.g., polypropylphenol, polybutylphenol, polypropylcresol and polybutylcresol, wherein the alkyl group has a number average molecular weight of about 500 to about 2100, while the most preferred alkyl group is a polybutyl group derived from polyisobutylene having a number average molecular weight in the range of about 700 to about 1300.

The preferred configuration of the high molecular weight alkyl-substituted hydroxyaromatic compound is that of a para-substituted mono-alkylphenol or a para-substituted mono-alkyl ortho-cresol. However, any hydroxyaromatic compound readily reactive in the Mannich condensation reaction may be employed. Thus, Mannich products made from hydroxyaromatic compounds having only one ring alkyl substituent, or two or more ring alkyl substituents are suitable for use in this invention. The long chain alkyl substituents may contain some residual unsaturation, but in general, are substantially saturated alkyl groups.

Representative amine reactants include, but are not limited to, alkylene polyamines having at least one suitably reactive primary or secondary amino group in the molecule. Other substituents such as hydroxyl, cyano, amido, etc., can be present in the polyamine. In a preferred embodiment, the alkylene polyamine is a polyethylene polyamine. Suitable alkylene polyamine reactants include ethylenediamine, diethylenetriamine, triethylenetetramine, tetraethylenepentamine and mixtures of such amines having nitrogen contents corresponding to alkylene polyamines of the formula $H_2N-(A-NH-)_nH$, where A is divalent ethylene or propylene and n is an integer of from 1 to 10, preferably 1 to 4.

The alkylene polyamines may be obtained by the reaction of ammonia and dihalo alkanes, such as dichloro alkanes.

The amine may also be an aliphatic diamine having one primary or secondary amino group and at least one tertiary amino group in the molecule. Examples of suitable polyamines include N,N,N",N"-tetraalkyldialkylenetriamines (two terminal tertiary amino groups and one central secondary amino group), N,N,N',N"-tetraalkyltrialkylenetetramines (one terminal tertiary amino group, two internal tertiary amino groups and one terminal primary amino group), N,N,N',N",N"'-pentaalkyltrialkylenetetramines (one terminal tertiary amino group, two internal tertiary amino groups and one terminal secondary amino group), N,N-dihydroxyalkyl-alpha, omega-alkylenediamines (one terminal tertiary amino group and one terminal primary amino group), N,N,N'-trihydroxyalkyl-alpha, omega-alkylenediamines (one terminal tertiary amino group and one terminal secondary amino group), tris(dialkylaminoalkyl)aminoalkylmethanes (three terminal tertiary amino groups and one terminal primary amino group), and similar compounds, wherein the alkyl groups are the same or different and typically contain no more than about 12 carbon atoms each, and which preferably contain from 1 to 4 carbon atoms each. Most preferably these alkyl groups are methyl and/or ethyl groups. Preferred polyamine reactants are N,N-dialkyl-alpha, omega-alkylenediamine, such as those having from 3 to about 6 carbon atoms in the alkylene group and from 1 to about 12 carbon atoms in each of the alkyl groups, which most preferably are the same but which can be different. Most preferred is N,N-dimethyl-1,3-propanediamine and N-methyl piperazine.

Examples of polyamines having one reactive primary or secondary amino group that can participate in the Mannich condensation reaction, and at least one sterically hindered amino group that cannot participate directly in the Mannich condensation reaction to any appreciable extent include N-(tert-butyl)-1,3-propanediamine, N-neopentyl-1,3-propanediamine, N-(tert-butyl)-1-methyl-1,2-ethanediamine, N-(tert-butyl)-1-methyl-1,3-propanediamine, and 3,5-di(tert-butyl)aminoethylpiperazine.

Representative aldehydes for use in the preparation of the Mannich base products include the aliphatic aldehydes such as formaldehyde, acetaldehyde, propionaldehyde, butyraldehyde, valeraldehyde, caproaldehyde, heptaldehyde, stearaldehyde. Aromatic aldehydes which may be used include benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde or formalin.

The condensation reaction among the alkylphenol, the specified amine(s) and the aldehyde may be conducted at a temperature typically in the range of about 40° to about 200° C. The reaction can be conducted in bulk (no diluent or solvent) or in a solvent or diluent. Water is evolved and can be removed by azeotropic distillation during the course of the reaction. Typically, the Mannich reaction products are formed by reacting the alkyl-substituted hydroxyaromatic compound, the amine and aldehyde in the molar ratio of 1.0:0.5-2.0:1.0-3.0, respectively.

Suitable Mannich base detergents for use in the present invention include those detergents taught in U.S. Pat. Nos. 4,231,759; 5,514,190; 5,634,951; 5,697,988; 5,725,612; and 5,876,468, the disclosures of which are incorporated herein by reference.

Hydrocarbyl amine detergents are known materials prepared by known process technology. One common process involves halogenation of a long chain aliphatic hydrocarbon such as a polymer of ethylene, propylene, butylene, isobutene, or copolymers such as ethylene and propylene, butylene and isobutylene, and the like, followed by reaction of the resultant halogenated hydrocarbon with a polyamine. If desired, at least some of the product can be converted into an amine salt by treatment with an appropriate quantity of an acid. The products formed by the halogenation route often contain a small amount of residual halogen such as chlorine. Another way of producing suitable aliphatic polyamines involves controlled oxidation (e.g., with air or a peroxide) of a polyolefin such as polyisobutene followed by reaction of the oxidized polyolefin with a polyamine. For synthesis details for preparing such aliphatic polyamine detergent/dispersants, see for example U.S. Pat. Nos. 3,438,757; 3,454,555; 3,485,601; 3,565,804; 3,573,010; 3,574,576; 3,671,511; 3,746,520; 3,756,793; 3,844,958; 3,852,258; 3,864,098; 3,876,704; 3,884,647; 3,898,056; 3,950,426; 3,960,515; 4,022,589; 4,039,300; 4,128,403; 4,166,726; 4,168,242; 5,034,471; 5,086,115; 5,112,364; and 5,124,484; and published European Patent Application 384,086. The disclosures of each of the foregoing documents are incorporated herein by reference. The long chain substituent(s) of the hydrocarbyl amine detergent most preferably contain(s) an average of 50 to 350 carbon atoms in the form of alkyl or alkenyl groups (with or without a small residual amount of halogen substitution). Alkenyl substituents derived from poly-alpha-olefin homopolymers or copolymers of appropriate molecular weight (e.g., propene homopolymers, butene homopolymers, $C_3$ and $C_4$ alpha-olefin copolymers, and the like) are suitable. Most preferably, the substituent is a polyisobutenyl group formed from polyisobutene having a number average molecular weight (as determined by gel permeation chromatography) in the range of 500 to 2000, preferably 600 to 1800, most preferably 700 to 1600.

Polyetheramines suitable for use as the detergents of the present invention are "single molecule" additives, incorporating both amine and polyether functionalities within the same molecule. The polyether backbone can be based on propylene oxide, ethylene oxide, butylene oxide, or mixtures of these. The most preferred are propylene oxide or butylene oxide or mixture thereof to impart good fuel solubility. The polyetheramines can be monoamines, diamines or triamines. Examples of commercially available polyetheramines are those under the tradename Jeffamines™ available from Huntsman Chemical company and the poly(oxyalkylene) carbamates available from Chevron Chemical Company. The molecular weight of the polyetheramines will typically range from 500 to 3000. Other suitable polyetheramines are those compounds taught in U.S. Pat. Nos. 4,191,537; 4,236,020; 4,288,612; 5,089,029; 5,112,364; 5,322,529; 5,514,190 and 5,522,906.

When formulating the fuel compositions of this invention, the injector deposit control additive (with our without other additives) is employed in amounts sufficient to reduce or eliminate deposits including injector deposits and/or control soot formation. Thus the fuels will contain minor amounts of the injector deposit control additive proportioned so as to prevent or reduce formation of engine deposits, especially fuel injector deposits. Generally speaking the fuel compositions of this invention will contain an amount of injector deposit control additive sufficient to provide from about 0.1–100, preferably 0.3–10, more preferably 0.5–5, pounds by weight of additive per thousand barrels by volume of fuel.

The base fuels used in formulating the fuel compositions of the present invention include any base fuels suitable for use in the operation of direct injection gasoline engines such as leaded or unleaded motor gasolines, and so-called reformulated gasolines which typically contain both hydrocarbons of the gasoline boiling range and fuel-soluble oxygenated blending agents ("oxygenates"), such as alcohols, ethers and other suitable oxygen-containing organic compounds. Preferably, the fuel is a mixture of hydrocarbons boiling in the gasoline boiling range. This fuel may consist of straight chain or branch chain paraffins, cycloparaffins, olefins, aromatic hydrocarbons or any mixture of these. The gasoline can be derived from straight run naptha, polymer gasoline, natural gasoline or from catalytically reformed stocks boiling in the range from about 80° to about 450° F. The octane level of the gasoline is not critical and any conventional gasoline may be employed in the practice of this invention.

Oxygenates suitable for use in the present invention include methanol, ethanol, isopropanol, t-butanol, mixed C1 to C5 alcohols, methyl tertiary butyl ether, tertiary amyl methyl ether, ethyl tertiary butyl ether and mixed ethers. Oxygenates, when used, will normally be present in the base fuel in an amount below about 30% by volume, and preferably in an amount that provides an oxygen content in the overall fuel in the range of about 0.5 to about 5 percent by volume.

In a preferred embodiment, the detergents are preferably used with a liquid carrier or induction aid. Such carriers can be of various types, such as for example liquid poly-α-olefin oligomers, mineral oils, liquid poly(oxyalkylene) compounds, liquid alcohols or polyols, polyalkenes, liquid esters, and similar liquid carriers. Mixtures of two or more such carriers can be employed.

Preferred liquid carriers include 1) a mineral oil or a blend of mineral oils that have a viscosity index of less than about 120, 2) one or more poly-α-olefin oligomers, 3) one or more poly(oxyalkylene) compounds having an average molecular weight in the range of about 500 to about 3000, 4) polyalkenes, 5) polyalkyl-substituted hydroxyaromatic compounds or 6) mixtures thereof. The mineral oil carrier fluids that can be used include paraffinic, naphthenic and asphaltic oils, and can be derived from various petroleum crude oils and processed in any suitable manner. For example, the mineral oils may be solvent extracted or hydrotreated oils. Reclaimed mineral oils can also be used. Hydrotreated oils are the most preferred. Preferably the mineral oil used has a viscosity at 40° C. of less than about 1600 SUS, and more preferably between about 300 and 1500 SUS at 40° C. Paraffinic mineral oils most preferably have viscosities at 40° C. in the range of about 475 SUS to about 700 SUS. For best results, it is highly desirable that the mineral oil have a viscosity index of less than about 100, more preferably, less than about 70 and most preferably in the range of from about 30 to about 60.

The poly-α-olefins (PAO) suitable for use as carrier fluids are the hydrotreated and unhydrotreated poly-α-olefin oligomers, i.e., hydrogenated or unhydrogenated products, primarily trimers, tetramers and pentamers of α-olefin monomers, which monomers contain from 6 to 12, generally 8 to 12 and most preferably about 10 carbon atoms. Their synthesis is outlined in *Hydrocarbon Processing,* February 1982, page 75 et seq., and in U.S. Pat. Nos. 3,763,244; 3,780,128; 4,172,855; 4,218,330; and 4,950,822. The usual process essentially comprises catalytic oligomerization of short chain linear alpha olefins (suitably obtained by catalytic treatment of ethylene). The poly-α-olefins used as carriers will usually have a viscosity (measured at 100° C.) in the range of 2 to 20 centistokes (cSt). Preferably, the poly-α-olefin has a viscosity of at least 8 cSt, and most preferably about 10 cSt at 100° C.

The poly (oxyalkylene) compounds which are among the preferred carrier fluids for use in this invention are fuel-soluble compounds which can be represented by the following formula

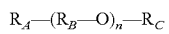

wherein $R_A$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_B$ is an alkylene group having 2–10 carbon atoms (preferably 2–4 carbon atoms), $R_C$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and n is an integer from 1 to 500 and preferably in the range of from 3 to 120 representing the number (usually an average number) of repeating alkyleneoxy groups. In compounds having multiple —$R_B$—O— groups, $R_B$ can be the same or different alkylene group and where different, can be arranged randomly or in blocks. Preferred poly (oxyalkylene) compounds are monools comprised of repeating units formed by reacting an alcohol with one or more alkylene oxides, preferably one alkylene oxide, more preferably propylene oxide or butylene oxide.

The average molecular weight of the poly (oxyalkylene) compounds used as carrier fluids is preferably in the range of from about 500 to about 3000, more preferably from about 750 to about 2500, and most preferably from above about 1000 to about 2000.

One useful sub-group of poly (oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being fully incorporated herein by reference.

A preferred sub-group of poly (oxyalkylene) compounds is comprised of one or a mixture of alkylpoly (oxyalkylene) monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly (oxyalkylene) carriers used in the practice of this invention preferably have viscosities in their undiluted state of at least about 60 cSt at 40° C. (more preferably at least about 70 cSt at 40° C.) and at least about 11 cSt at 100° C. (more preferably at least about 13 cSt at 100° C.). In addition, the poly (oxyalkylene) compounds used in the practice of this invention preferably have viscosities in their undiluted state of no more than about 400 cSt at 40° C. and no more than about 50 cSt at 100° C. More preferably, their viscosities will not exceed about 300 cSt at 40° C. and will not exceed about 40 cSt at 100° C.

Preferred poly (oxyalkylene) compounds also include poly (oxyalkylene) glycol compounds and monoether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least 80 mole % of the oxyalkylene groups in the molecule are derived from 1,2-propylene oxide. Details concerning preparation of such poly(oxyalkylene) compounds are referred to, for example, in Kirk-Othmer, *Encyclopedia of Chemical Technology*, Third Edition, Volume 18, pages 633–645 (Copyright 1982 by John Wiley & Sons), and in references cited therein, the foregoing excerpt of the Kirk-Othmer encyclopedia and the references cited therein being incorporated herein in toto by reference. U.S. Pat. Nos. 2,425,755; 2,425,845; 2,448,664; and 2,457,139 also describe such procedures, and are fully incorporated herein by reference.

The poly (oxyalkylene) compounds, when used, pursuant to this invention will contain a sufficient number of branched oxyalkylene units (e.g., methyldimethyleneoxy units and/or ethyldimethyleneoxy units) to render the poly (oxyalkylene) compound gasoline soluble.

Suitable poly (oxyalkylene) compounds for use in the present invention include those taught in U.S. Pat. Nos. 5,514,190; 5,634,951; 5,697,988; 5,725,612; 5,814,111 and 5,873,917, the disclosures of which are incorporated herein by reference.

The polyalkenes suitable for use as carrier fluids in the present invention include polypropene and polybutene. The polyalkenes of the present invention preferably have a molecular weight distribution (Mw/Mn) of less than 4. In a preferred embodiment, the polyalkenes have a MWD of 1.4 or below. Preferred polybutenes have a number average molecular weight (Mn) of from about 500 to about 2000, preferably 600 to about 1000, as determined by gel permeation chromatography (GPC). Suitable polyalkenes for use in the present invention are taught in U.S. Pat. No. 6,048,373.

The polyalkyl-substituted hydroxyaromatic compounds suitable for use as carrier fluid in the present invention include those compounds known in the art as taught in U.S. Pat. Nos. 3,849,085; 4,231,759; 4,238,628; 5,300,701; 5,755,835 and 5,873,917, the disclosures of which are incorporated herein by reference.

When the carrier fluids are used in combination with the amine detergents, the ratio (wt/wt) of detergent to carrier fluid(s) is typically in the range of from 1:0.1 to 1:3.

The additives used in formulating the preferred fuels of the present invention can be blended into the base fuel individually or in various sub-combinations. However, it is preferable to blend all of the components concurrently using an additive concentrate as this takes advantage of the mutual compatibility afforded by the combination of ingredients when in the form of an additive concentrate. Also use of a concentrate reduces blending time and lessens the possibility of blending errors.

A preferred embodiment of the present invention comprises a method for controlling injector deposits in a direct injection gasoline engine which comprises introducing into a direct injection gasoline engine with the combustion intake charge a spark-ignition fuel composition comprising a) a spark-ignition fuel and b) a fuel-soluble injector deposit control additive as described herein.

Further, the fuel-soluble additives (b) may be supplied in the form of a concentrate for use as an after-market additive or top treat for addition to the fuel in the vehicle or fuel storage facility.

Another preferred embodiment of the present invention comprises fuel compositions containing the fuel-soluble additives (b) described herein.

EXAMPLES

The practice and advantages of this invention are demonstrated by the following examples which are presented for purposes of illustration and not limitation.

To demonstrate the effectiveness of the additive systems of the present invention in reducing deposits in direct injection gasoline engines, tests were conducted in a 1982 Nissan Z22e (2.2 liter) dual-sparkplug, four-cylinder engine modified to run in a homogeneous direct injection mode, at a fuel rich lambda of 0.8 to accelerate injector deposit formation. Details of this test are set forth in Aradi, A. A., Imoehl, B., Avery, N. L., Wells, P. P., and Grosser, R. W.: "The Effect of Fuel Composition and Engine Operating Parameters on Injector Deposits in a High-Pressure Direct Injection Gasoline (DIG) Research Engine", SAE Technical Paper 1999-01-3690 (1999).

Modifications to the engine included replacing the exhaust-side spark plugs with pre-production high-pressure common rail direct injectors, removing the OEM spark and fuel system, and installing a high-pressure fuel system and universal engine controller. Table 1 summarizes the specifications of the modified test engine. For homogeneous combustion, flat-top pistons and the conventional gasoline spark ignition combustion chamber design were found to be sufficient for this type of research work. The injectors were located on the hot (i.e. exhaust) side of the engine to favor high tip temperatures to promote injector deposit.

The rate of injector deposit formation was evaluated through the use of this specially developed steady-state engine test. Engine operating conditions for each test point were determined by mapping injector tip temperatures throughout the engine operating map range. The injectors were modified with thermocouples at the tip. Key parameters were inlet air and fuel temperatures, engine speed, and engine load. The inlet air and fuel temperatures were subsequently controlled at 35° C. and 32° C., respectively.

TABLE 1

Test Engine Specifications

| | |
|---|---|
| Type | Four Cylinder In-Line 2.2 L Nissan Engine Converted for DI Operation |
| Displacement | 2187 cubic centimeters |
| Plugs/cylinder | 1 (stock configuration: 2) |
| Valves/cylinder | 2 |
| Bore | 87 millimeters |
| Stroke | 92 millimeters |
| Fuel System | Common Rail High Pressure Direct Injection |
| Fuel Pressure | 6900 kPa (closed loop) |
| Engine Controller | Universal Laboratory System |
| Injection Timing | 300 degrees BTDC |
| Coolant Temperature (° C.) | 85 |
| Oil Temperature (° C.) | 95 |

At constant inlet air/fuel temperature and engine load, tip temperature remained constant at engine speeds of 1500, 2000, 2500, and 3000 rpm. However, at constant engine speed, tip temperatures increase with load. For five load points, 200, 300, 400, 500, and 600 mg/stroke air charge, increasing tip temperatures of 120, 140, 157, 173, and 184° C., respectively, were observed for each load.

Through previous research, it was determined that a tip temperature of 173° C. provided optimum conditions for injector deposit formation in this engine. Table 2 sets forth the key test conditions used in performing the evaluation of the additives of the present invention.

TABLE 2

Key Test Conditions

| | |
|---|---|
| Engine Speed (rpm) | 2500 |
| Inlet Air Temp. (° C.) | 35 |
| Inlet Fuel Temp. (° C.) | 32 |
| Exit Coolant Temp. (° C.) | 85 |
| Exit Oil Temp. (° C.) | 95 |
| Load (mg air/stroke) | 500 |
| Injector Tip Temp. (° C.) | 173 |

The test was divided into three periods: engine warm-up, an operator-assisted period, and test period. Engine speed was controlled using the engine dynamometer controller, and the engine throttle was manipulated to control air charge using a standard automotive airflow meter as feedback in a closed-loop control system. Engine fueling was controlled in two ways. During warm-up, injector pulse width was controlled using a standard mass airflow strategy and exhaust gas sensor controlling the air/fuel mixture to stoichiometric. During the operator interaction period, the pulse width was manually set for each injector using wide-range lambda sensors in the exhaust port of each cylinder. Fuel flow was measured using a volumetric flow meter and a temperature-corrected density value was used to calculate mass flow.

Each fuel was run at a load condition of 500 mg/stroke. Injector deposit formation was followed by measuring total engine fuel flow at fixed speed, air charge (mass of air per intake stroke), and the lambda signal from each cylinder over a test period of six hours.

To help minimize injector-to-injector variability the same set of injectors was used for all tests at a particular engine load, with each injector always in the same cylinder.

The additives of the invention and the comparative additives tested were prepared as follows:

Deposit Control Additive 1

16.2 grams of 3-dimethylaminopropylamine and 60 grams of heptane were added to a flask equipped for distillation. While stirring, 12.8 grams of a 37% aqueous formaldehyde solution was slowly added to the flask. Heptane and water were removed by heating the mixture to 80° C. under vacuum. The resulting product was clear and colorless. The product was identified as principally 1,3,5-tris[3-(dimethylamino)propyl]hexahydro-1,3,5-triazine by IR and NMR spectroscopies, having the structure:

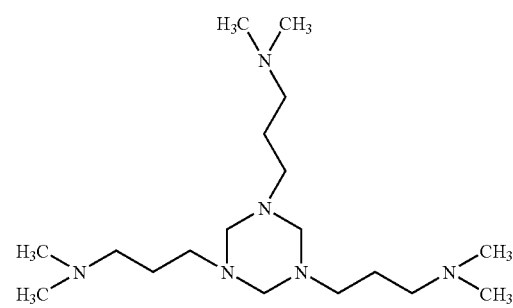

Deposit Control Additive 2

62.64 grams of linoleyl amine, 49.03 grams of 3-dimethylaminopropylamine and 48 grams of heptane were added to a flask equipped for distillation. While stirring, 65.60 grams of a 37% aqueous formaldehyde solution was slowly added to the flask. Heptane and water were removed by heating the mixture to 90° C. under vacuum. The resulting product was clear and light yellow. The product is believed to principally contain a substituted triazine of the formula:

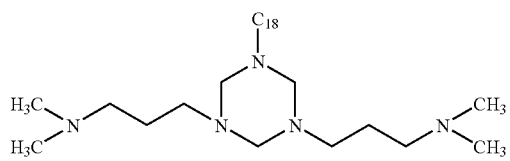

Deposit Control Additive 3 p-Cresol (50.3 g, 0.465 mol) and 37.7 g of 37% aqueous formaldehyde (0.465 mol) were dissolved in 50 ml of isopropanol in a 500-ml round bottom flask. To this solution was added 47.5 g (0.465 mol) of N,N-dimethylaminopropyl amine (DMAPA) in 50 ml of isopropanol. The resulting solution was then refluxed for 2 hours. After cooling, the resulting solution was evaporated under reduced pressure to afford 98.7 g of product. The product formed is believed to principally be a p-cresol/DMAPA Mannich having the following formula:

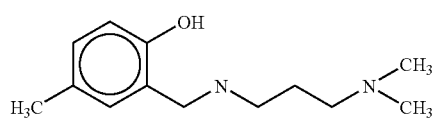

Deposit Control Additive 4

N,N-dimethylaminopropyl amine (DMAPA) having the formula:

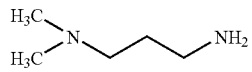

Deposit Control Additive 5

288.12 grams (1.006 moles) of tall oil fatty acid, 103.52 grams (1.012 moles) were added to a reaction flask containing xylenes. The flask was equipped with a Dean-Stark trap. The mixture was heated to reflux (about 150° C.) and water produced in the reaction was collected in the trap. After about 1.0 moles of water had been produced by the reaction, the xylenes solvent was removed by vacuum distillation. The resulting product was a dark brown viscous liquid. The product formed is believed to principally be an amide having the following formula:

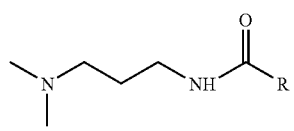

wherein R is the residue of the tall oil fatty acid.

Comparative Deposit Control Additive 1 (C.1)

21.05 grams of Armeen® CD (cocoalkyl (predominantly $C_{14}$) amine obtained from Akzo Nobel) and 60 grams of heptane were added to a flask equipped for distillation. While stirring, 8.36 grams of a 37% aqueous formaldehyde solution was slowly added to the flask. Heptane and water were removed by heating the mixture to 90° C. under vacuum. The resulting product was clear and colorless. The product formed is believed to principally be a cocoalkylamine triazine having the following formula:

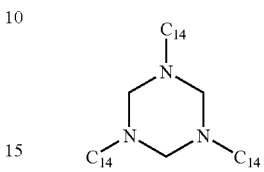

Gasoline fuel compositions were subjected to the above-described engine tests whereby the substantial effectiveness of these compositions in minimizing injector deposit formation was conclusively demonstrated. The fuel used for these tests was a Howell EEE fuel having a $T_{90}$ (° C.) of 160, an olefin content of 1.2% and a sulfur content of 20 ppm. The injector deposit control additives used, the percent flow loss and the improvement in flow loss compared to base fuel are set forth in Table 3.

TABLE 3

Keep Clean Performance.

| Run | Deposit Control Additive | Additive Treat Rate (PTB) | Average Flow Loss (avg. 4 injectors after 12 hours, %) | Reduction in Flow Loss (%)[A] |
|---|---|---|---|---|
| 1* | None | — | 14.6 | — |
| 2 | 1 | 3.0 | 2.2 | 85 |
| 3* | None | — | 16.0 | — |
| 4 | 1 | 2.0 | 5.4 | 66 |
| 5* | None | — | 24.2 | — |
| 6 | 2 | 3.0 | 5.8 | 76 |
| 7* | None | — | 16.0 | — |
| 8 | 3 | 3.0 | 2.6 | 84 |
| 9* | None | — | 14.9 | — |
| 10 | 4 | 3.0 | 5.6 | 62 |
| 11* | None | — | 28.05 | — |
| 12 | 5 | 3.0 | 6.1 | 78.3 |
| 13* | None | — | 25.2 | — |
| 14* | C.1 | 3.0 | 23.5 | 7 |

*Comparative examples
[A]Average of base fuel runs run closest in time before and after the additive run.

It is clear that the fuel compositions of the present invention (Runs 2, 4, 6, 8 and 10) exhibit significantly reduced volume of injector deposits, compared to the base fuel or base fuel plus derivatives not of the invention (Run 14)) as evidenced by the reduced amount of flow loss exhibited in injectors operated on fuels containing the additives of the present invention.

The ability of the additives of the present invention to clean up dirty injectors is demonstrated in the following examples. The Nissan DIG engine was run for 12 hours on unadditized fuel as described above. Next, with the dirty injectors undisturbed, the engine was run for 12 hours on base fuel plus additive. Conditions were the same for both the dirty-up and clean-up phases of the test. The results of the Clean Up are shown in Table 4 in terms of percent flow restored to the injectors.

TABLE 4

| Injector Clean Up | | |
|---|---|---|
| Deposit Control Additive | Additive Treat Rate (PTB) | Flow Restored (%) |
| 1 | 1 | 79 |
| 1 | 5 | 94 |

It is clear from the above Table 4, that even very low doses of the additives of the present invention significantly reduce the injector deposits and restore flow to the injectors.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as a Mannich condensation reaction) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" or "gasoline-soluble" means that the substance under discussion should be sufficiently soluble at 20° C. in the base fuel selected for use to reach at least the minimum concentration required to enable the substance to serve its intended function. Preferably, the substance will have a substantially greater solubility in the base fuel than this. However, the substance need not dissolve in the base fuel in all proportions.

At numerous places throughout this specification, reference has been made to a number of U.S. patents. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A method for controlling injector deposits in a direct injection gasoline engine which comprises introducing into a direct injection gasoline engine with the combustion intake charge a spark-ignition fuel composition comprising a) a spark-ignition fuel and b) a fuel-soluble compound having the formula (I):

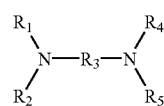

(I)

wherein $R_1$ and $R_2$ are independently $C_{1-4}$ alkyl, $R_3$ is a radical of the formula $C_mH_{2m}$ wherein m is an integer of 2 to 6, $R_4$ and $R_5$ are each independently (i)

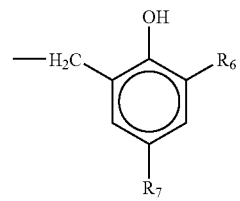

wherein $R_6$ is selected from the group consisting of hydrogen and $C_{1-4}$ alkyls and $R_7$ is selected from the group consisting of hydrogen and $C_{1-30}$ alkyl, (ii)

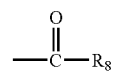

wherein $R_8$ is a saturated or unsaturated, linear, branched or cyclic, $C_{7-23}$ hydrocarbyl group or (iii) wherein $R_4$ and $R_5$ together with the nitrogen atom to which they are bonded, form a cyclic ring in which further hetero atoms may be incorporated.

2. A method for controlling injector deposits in a direct injection gasoline engine which comprises introducing into a direct injection gasoline engine with the combustion intake charge a spark-ignition fuel composition comprising a) a spark-ignition fuel and b) a fuel-soluble compound:

wherein said fuel-soluble compound (b) comprises 1,3,5-tris[3-(dimethylamino)propyl]hexahydro-1,3,5-triazine.

* * * * *